United States Patent [19]
Teed

[11] 3,843,760
[45] Oct. 22, 1974

[54] CHANNEL CLOTH EXTRUSION APPARATUS AND PROCESS

[75] Inventor: Richard K. Teed, Greenwood, S.C.

[73] Assignee: Riegel Textile Corporation, Wave Shoals, S.C.

[22] Filed: Apr. 4, 1972

[21] Appl. No.: 241,062

[52] U.S. Cl. .............. 264/171, 117/7, 156/72, 156/229, 161/67, 264/174, 264/243, 264/DIG. 65
[51] Int. Cl. .............................. B29f 3/10
[58] Field of Search .......... 264/171, 173, 172, 174, 264/DIG. 65; 161/62, 66, 67; 117/7; 156/229, 72, 435, 494, 578

[56] References Cited
UNITED STATES PATENTS

| | | |
|---|---|---|
| 2,792,323 | 5/1957 | Ashcroft et al. ...................... 156/72 |
| 2,872,965 | 2/1959 | Sisson ................................. 264/171 |
| 3,150,023 | 9/1964 | Penman ................................. 161/67 |
| 3,150,024 | 9/1964 | Penman ................................. 161/67 |
| 3,404,487 | 10/1968 | Johnson ............................... 156/72 |
| 3,537,946 | 11/1970 | Truax et al. ......................... 156/72 |
| 3,607,503 | 9/1971 | Parlin et al. ......................... 161/67 |
| 3,732,136 | 5/1973 | Lord .................................... 161/66 |

Primary Examiner—Jeffery R. Thurlow
Attorney, Agent, or Firm—Pennie & Edmonds

[57] ABSTRACT

An apparatus and process for extruding a backing plastic layer upon channel cloth in a manner which aligns and maintains a plurality of rows of pile in precise parallel relation and which avoids crushing of the pile.

9 Claims, 4 Drawing Figures

3,843,760

CHANNEL CLOTH EXTRUSION APPARATUS AND PROCESS

BACKGROUND OF THE INVENTION

The present invention concerns improvements in depositing a backing layer upon channel cloth to provide weatherstripping having a requisite stiffness. In the manufacture of channel cloth, a series of parallel rows of insulating pile about ⅛ inch in height is woven integrally with a backing layer of textile material from which the rows of pile project. Subsequently, prior to slitting or separating the separate rows to form weatherstripping, the fabric backing layer is stiffened by being impregnated or coated with a suitable plastic material.

It is the purpose of the present invention to provide an improved apparatus and method for extruding a plastic backing layer upon the textile backing of channel cloth in a manner which causes the rows of pile to become straightened and permanently set in a parallel relation so that subsequent weatherstripping slit therefrom will possess a high degree of dimensional uniformity.

SUMMARY OF THE INVENTION

According to the present invention, an apparatus and method are disclosed for depositing a thin layer of molten plastic upon the pretreated textile backing of a strip of channel cloth having a plurality of rows of weatherstripping pile projecting from the opposite side of the backing layer. During deposition of the plastic material and during subsequent cooling thereof, the channel cloth is maintained constantly in a stretched condition so that the pile rows become and are fixed in precisely aligned parallel positions. At all times during this process, the weatherstripping pile is protected against crushing.

DESCRIPTION OF A PREFERRED EMBODIMENT

Figure 1:
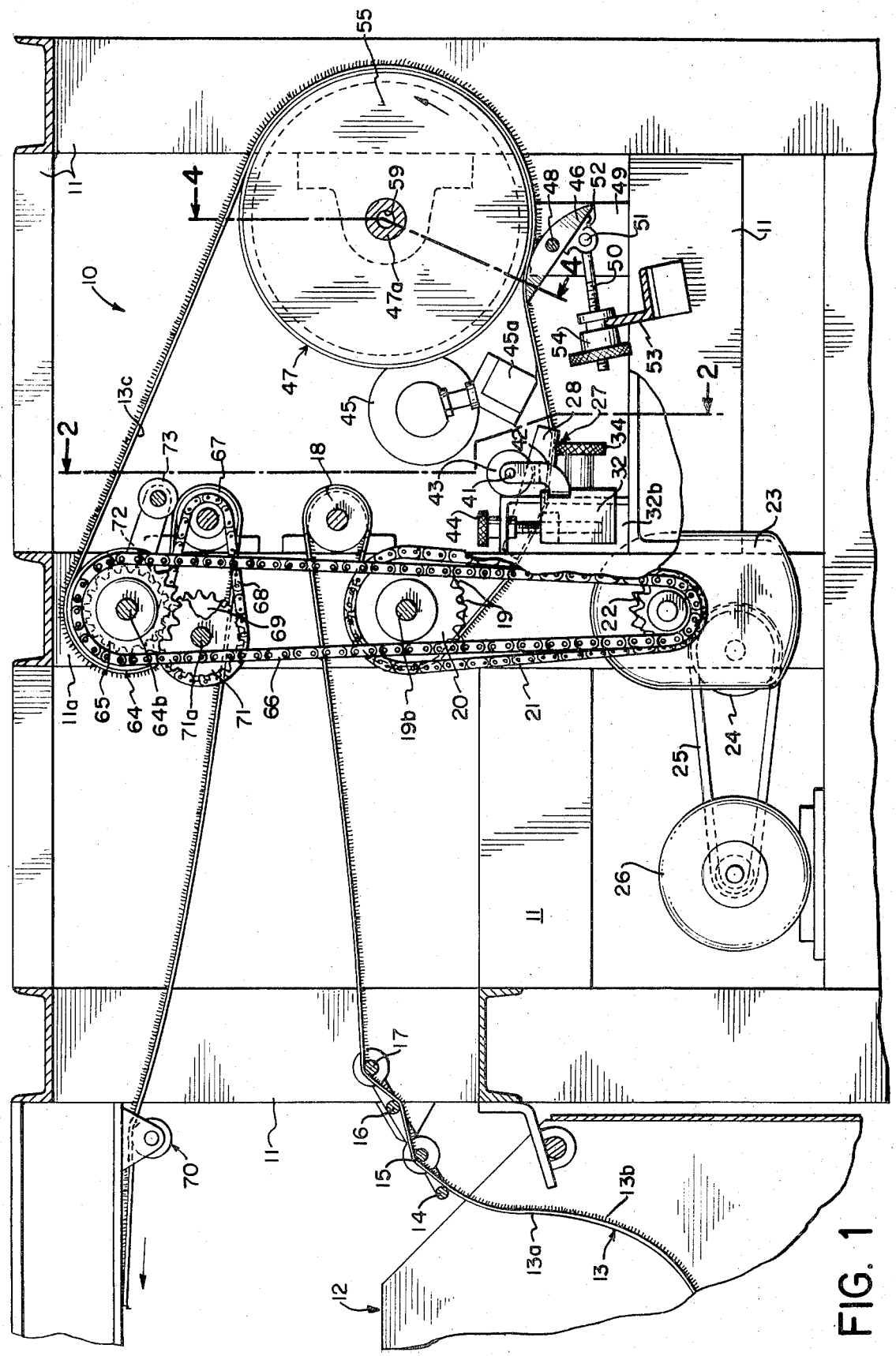
FIG. 1 is a side elevation of an extrusion apparatus constructed according to the present invention.
Figure 2:
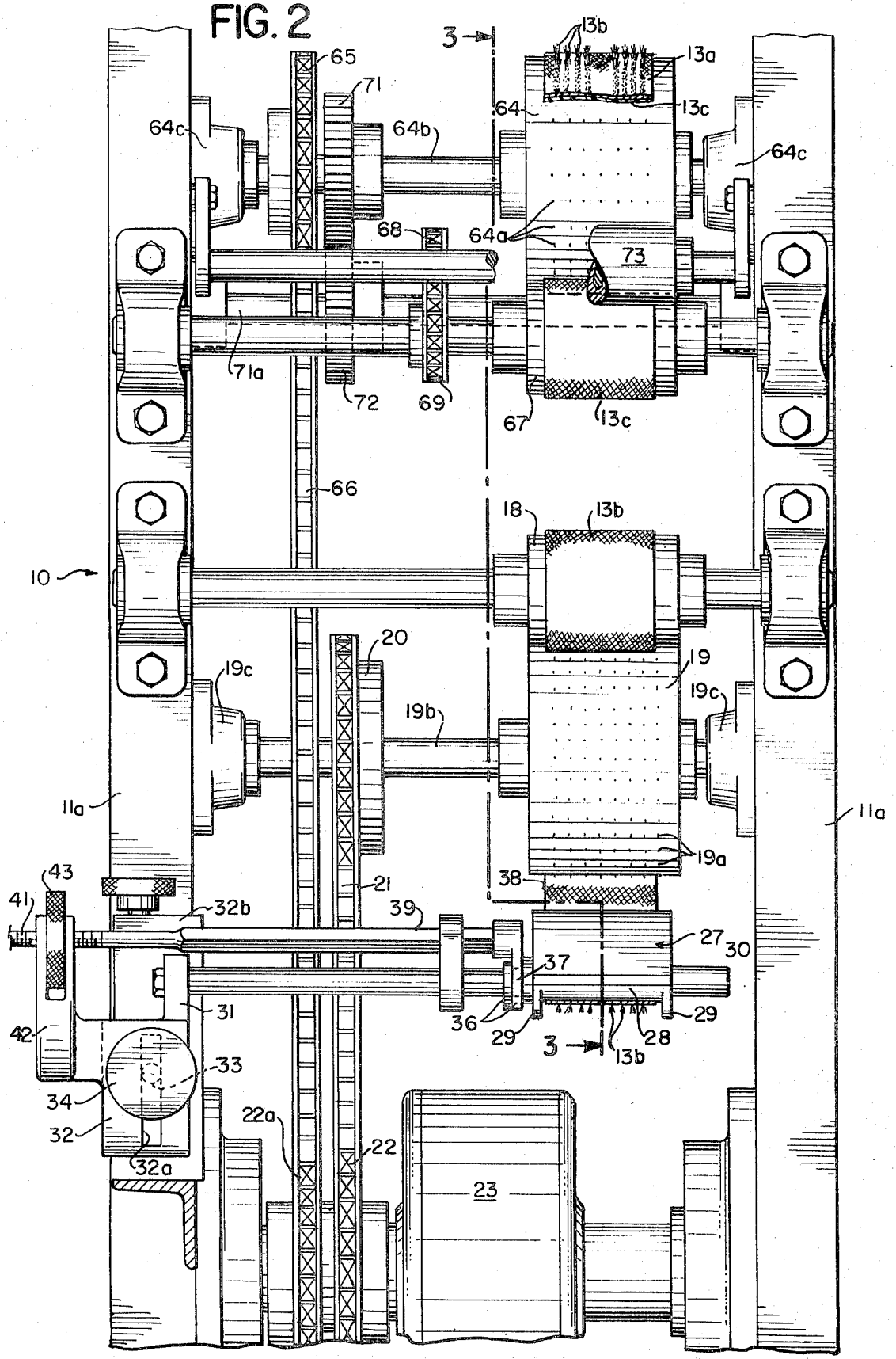
FIG. 2 is a vertical cross section taken in the direction of arrows 2—2 of FIG. 1.
Figure 3:
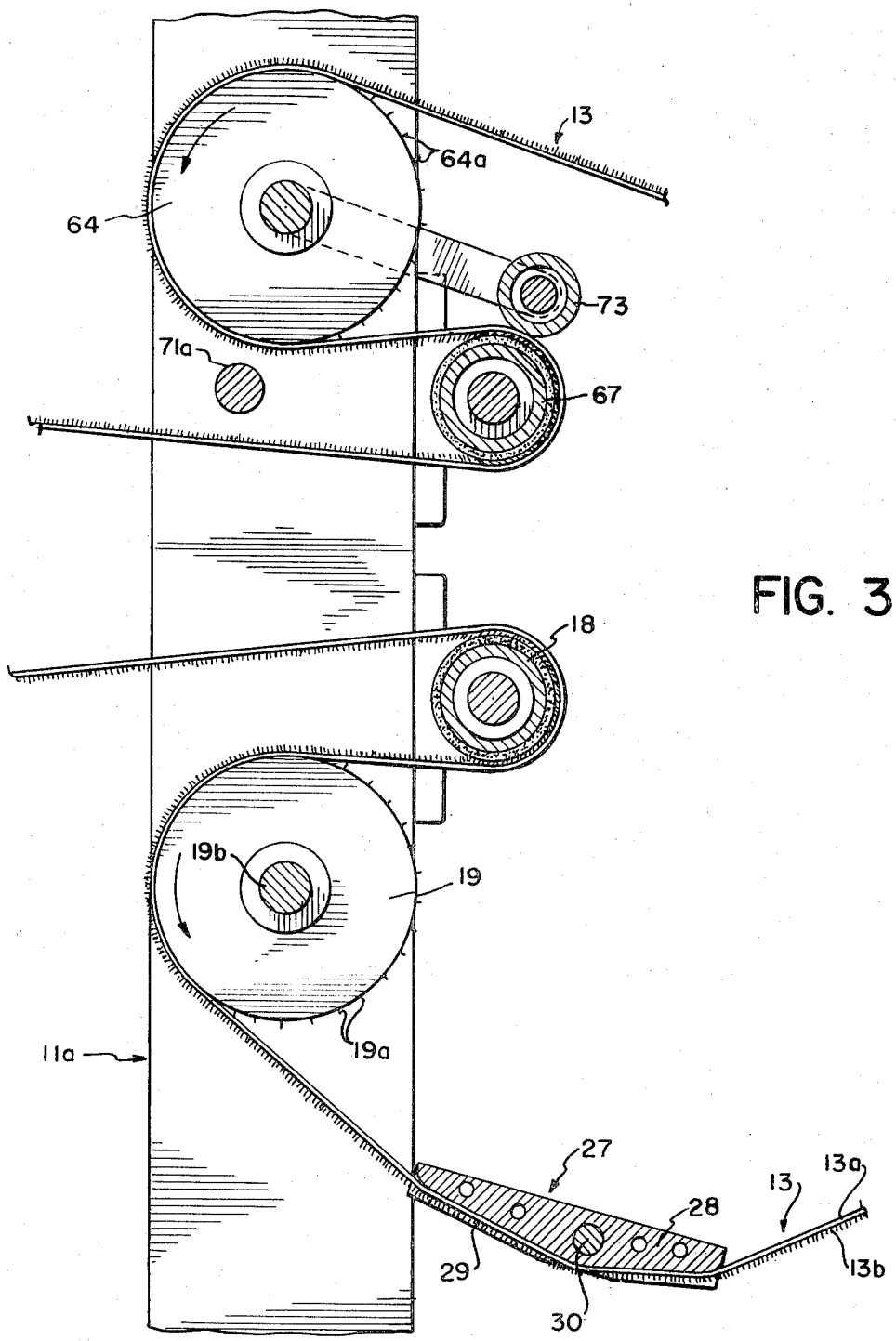
FIG. 3 is a vertical cross section taken in the direction of arrows 3—3 of FIG. 2.

Referring now to the drawing and initially to FIGS. 1 and 2 thereof, an extrusion apparatus 10 constructed according to the principles of the present invention has been illustrated. The apparatus 10 includes a series of interconnected frame members 11 which mount and support the operative portions of the extrusion apparatus 10. Immediately adjacent to the apparatus 10 is a scray 12 which holds a quantity of channel cloth 13 and supplies same to the apparatus 10. The cloth 13 consists, as is usual, of a fabric base strip or backing 13 from one surface of which a series of parallel rows of pile 13b project. Where fed from scray 12, the cloth 13 first passes over and under a series of guide bars 14–17 with the pile 13b facing downwardly. Cloth 13 next passes over an idler roller 18 which reverses the direction of the pile 13b so that when the cloth 13 then proceeds around the roller 19, the underside of backing 13a will be in contact therewith and the pile 13b will remain uncrushed. Roller 19 is equipped with a plurality of pins 19a which positively grip or engaged the underside of backing 13a without slipping. Roller 19 is connected to a shaft 19b journalled within bearings 19c carried by end frame members 11a. It should be noted that until the roller 19 engages the the backing 13a, the cloth 13 is substantially under no tension; that is to say, the pile 13b is not subjected to any crushing forces as the pile passes around bars 14–17 or around idler roller 18.

Roller 19 is driven by a sprocket 20 connected by chain 21 to the sprocket 22 driven by a variable speed drive unit 23. Input power to unit 23 is provided by pully 24, belt 25 and motor 26. After pin roller 19, channel cloth 13 passes beneath a preheater 27 which preheats the backing 13a. The preheater 27 consists of a heated head 28 having on opposite sides depending flanges 29 which are in effect edge guiding means for the cloth 13 as it passes beneath the head 28. The normal operating temperature of head 28 is about 300° F. The head 28 is adjustable both laterally and vertically and is slidably mounted upon a bar 30. One end of the bar 30 is held rigidly by an arm 31 which extends from a slidable mounting bracket 32. The bracket 32 has a vertical slot 32a therein which receives a screw 33 threaded into a fixed upright bracket 32b. Various height adjustments of bracket 32 and bar 30 are possible by raising or lowering the bracket 32 after first releasing the bracket by rotating knob 34. Knob 44 is connected to screw 44a which is threaded into bracket 32. Rotation of knob 44 will cause raising or lowering of bracket 32, bar 30 and head 28. Tightening of knob 34 will secure bracket 32 in position. Vertical spacing of head 28 from the backing 13a will regulate the amount of heat imparted to the backing.

Preheater head 28 is integrally connected to two spaced shoulders 36 which receive between them an arm 37 depending from yoke 38. The yoke 38 is connected to quadrangular bar 39. The bar 39 is threaded at 41 and extends through an arm 42 integrally connected to bracket 32. Knob 43 threaded to the bar 40 will cause translatory motion of the bar 39 when rotated, thus providing a lateral adjustment of preheater head 28.

After the backing 13a has been subjected to preheating, the cloth 13 passes beneath an extruder 45 having a head 45a which deposits a thin film (of about 8 mils thickness) of polypropylene 13c across the width of the backing 13a. Due to the preheating step, the layer of polypropylene is compatibly received and will thoroughly impregnate and adhere to the backing 13. While the plastic layer is still in a semimolten condition, the pile rows of the channel cloth 13 pass between arcuate plates 46 which press against the pile facing side of the backing 13a while the rows of pile pass between plate grooves 46a (see FIG. 4). Plates 46 press the semimolten plastic film 13c just deposited upon the channel cloth 13 into contact against a cooling drum 47 which causes the layer to become hardened as the channel cloth 13 traverses approximately 50° of the circumference of the drum 47. Plates 46 are pivotally mounted upon a common shaft 48 to a frame member 49. The degree of pressure asserted by plates 46 can be controlled by threaded shaft 50 pivotally connected at 51 to bracket 52 secured to the plates 46. The shaft 50 can be lengthened or shortened with respect to angle iron 53 by rotating knob 54.

Figure 4:
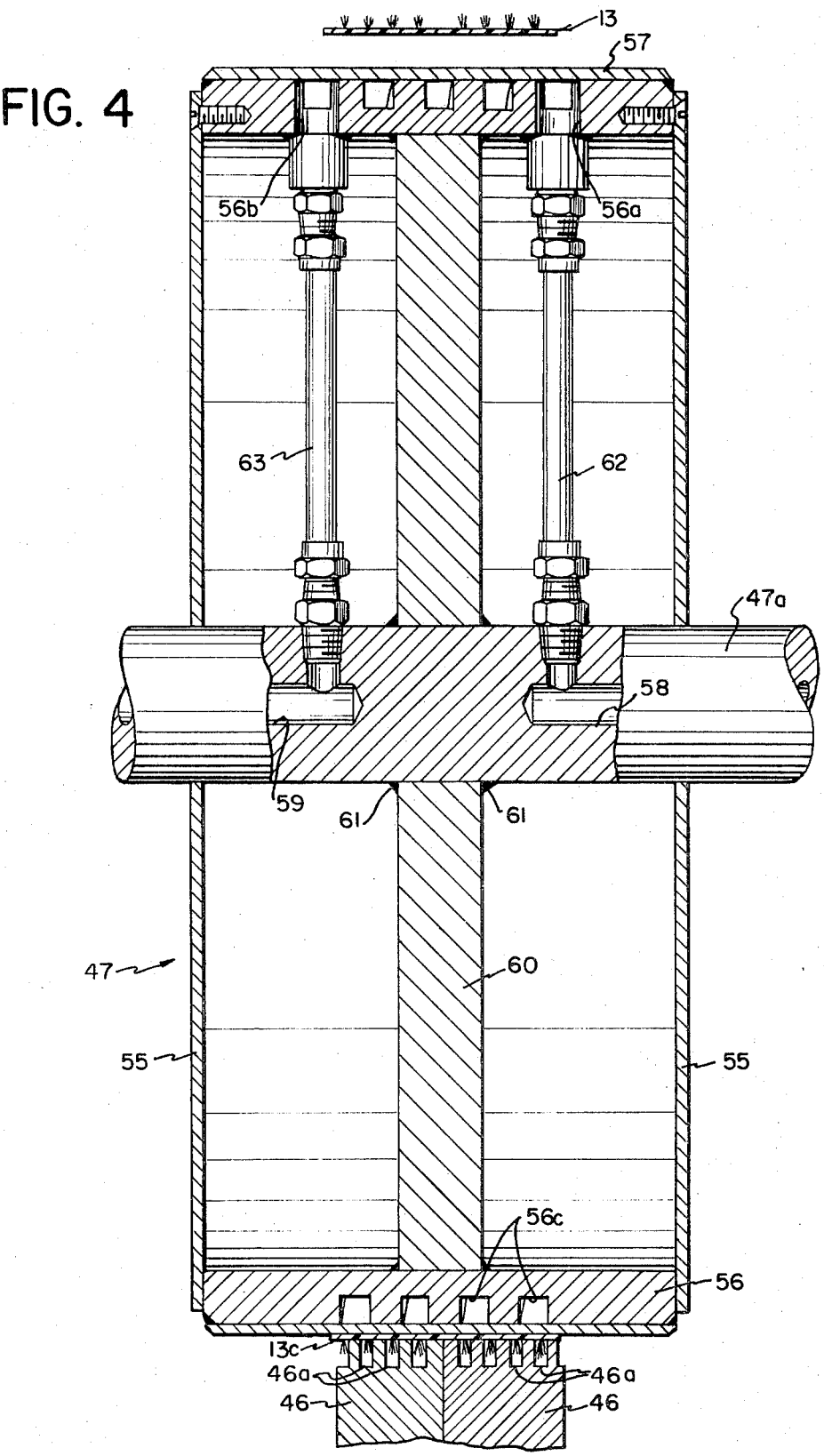
FIG. 4 is an enlarged cross section taken in the direction of arrows 4—4 of FIG. 1.

As best seen in FIG. 4, the cooling drum 47 consists of circular side plates 55 and circumferential members 56 and 57. Drum 47 is supported for rotation in frame members 11a by a hollow shaft 47a having an inlet conduit 58 and an outlet conduit 59 therein. Internally, the drum 47 is reinforced by a central circular support 60 welded at 61 to the shaft 47a. Member 56 is provided with inlet and outlet orifices 56a and 56b and tubular connectors 62, 63 provide for circulation of cooling water from conduit 58 through orifices 56a, 56b through spirally oriented cooling passage 56c and thence to outlet conduit 59.

After passing around cooling drum 47, the channel cloth 13 is engaged by a second pin roller 64 supported for rotation upon a shaft 64b journalled to frame members 11a by bearing blocks 64c. Pin roller 64 is driven by sprocket 65 by chain 66 which is connected to a drive sprocket 22a. The relationship between rollers 19 and 64 and their relative peripheral speed is important to the practice of the present invention. Roller 64 is driven, by way of example, approximately 7 to 8 percent faster than roller 19 and is slightly larger in diameter than roller 19. Furthermore, pins 64 do not pierce plastic film 13c but rather, the film will ride upon pins 64a. Since the pins are .032 inch in length, this together with the 8 mil. thickness of plastic film 13c will also effectively increase the circumferential travel of cloth 13. The overall effect is to provide a positive stretching of the channel cloth 13 between rollers 19 and 64 while the steps of preheating, extruding and cooling are taking place. In the present embodiment, the channel cloth 13 will be stretched approximately 15 percent during the extrusion process. It has been found that by using the present method and apparatus, the rows of pile 13a are strenghtened and secured during the extrusion process in precise parallel alignment each with respect to the other. This, of course, provides an extremely high quality end product which can be slit into separate weatherstripping by severing the backing between the rows of pile. Furthermore, it should be noted that throughout the passage of the channel cloth 13 between rollers 19 and 64, the rows of pile 13b are never crushed upon any surface. Such crushing would permanently deform the pile, particularly since the cloth 13 is being subjected to high heat during the extrusion process.

After passing around the second pin roller 64, the cloth 13, with its extruded backing, proceeds between rollers 67 and 73, the latter being an idler roller supported upon arms 74 which are mounted to shaft 64b. A sprocket 69 rotatable upon shaft 71a drives roller 67 through chain 68. Power to sprocket 69 is furnished by intermeshing engagement between gears 71 and 72. During its travel between rollers 73 and 67, the cloth 13 is under substantially no tension so that contact between pile 13b and roller 67 will not crush the pile. Roller 67 and roller 18 are both covered with a cork outer sheath 67a, 18a to assist in providing this protection. After roller 67, the now plastic coated channel cloth passes from the apparatus 10 at 70 for subsequent slitting of the base step into weatherstripping.

It will be understood that the foregoing description has been of a particular embodiment of the invention and is, therefore, merely representative. In order to appreciate fully the scope of the invention, reference should be made to the appended claims.

I claim:

1. An apparatus for extruding a thin layer of plastic material and the like on the back of a base strip of channel cloth having a plurality of parallel rows of weatherstripping pile projecting from the opposite side thereof comprising: a first roller including means on the surface thereof for positively gripping said base strip while permitting said rows of pile to project freely without crushing the pile; means for guiding channel cloth to said first roller, a second roller including means on the surface thereof for positively gripping said base strip while permitting said rows of pile to project freely without crushing the pile; means for driving said first and second rollers at different speeds to stretch the channel cloth therebetween sufficient to cause alignment of said pile in straight parallel rows and to maintain said base strip in a flattened condition; means for extruding a thin film of plastic material upon the back of said base strip while the channel cloth is in a stretched condition; means for substantially solidifying said plastic material while said cloth is in a stretched condition; and means for guiding said cloth to said solidifying means while pressing said base strip against a surface of said solidifying means to maintain the thickness of said plastic material backing within predetermined dimensional ranges.

2. The apparatus according to claim 1 wherein a plurality of pins project from said first and second rollers engaging said channel cloth base strip before and after extrusion of said plastic material layer.

3. The apparatus according to claim 2 wherein said extruding means is adapted to extrude a thin film of molten polypropylene upon said base strip, and said solidifying means comprises a cooling drum for receiving the extruded layer while permitting said rows of pile to project freely therefrom and said guiding means brings said thermoplastic material layer into contact with said cooling drum.

4. The apparatus according to claim 3 wherein said guiding means includes parallel arcuate plates which define pile grooves permitting said plates to bear against the channel cloth base strip between said rows of pile while maintaining the spacing between said parallel rows, with means for adjusting the relative pressure brought to bear by said plates against said base strip.

5. The apparatus according to claim 3 further comprising a preheater for heating said base strip prior to extrusion of said plastic material thereupon.

6. The apparatus according to claim 5 wherein said preheater includes edge guide means for controlling the position of said channel cloth as it passes beneath the preheater, and means for regulating and adjusting the height and lateral positioning of the preheater.

7. A method of depositing a thin layer of plastic material and the like upon the back of a base strip of channel cloth to provide dimensional accuracy within predetermined ranges, the cloth having a plurality of parallel rows of weatherstripping pile projecting from the opposite side thereof comprising the steps of: continuously feeding said channel cloth; subjecting said channel cloth to predetermined controlled lengthwise tension sufficient to maintain the base strip in a flattened condition and to maintain the pile rows in parallel alignment while positively stretching the base strip and simultaneously maintaining said rows of pile free from crushing contact; extruding a thin film of plastic material on the back of said base strip; guiding said channel cloth to a solidifying means while pressing the base strip against a surface of said solidifying means to maintain the thickness of said plastic material backing within said predetermined dimensional ranges and maintaining the parallel alignment and spacing of said pile rows; and permitting said backing strip to substantially solidify, said predetermined controlled lengthwise tension being continuously maintained prior to, during and after said extrusion and solidifying steps.

8. The method according to claim 7 wherein said plastic material is molten when extruded and said solidifying step is accomplished by cooling the plastic material to solidify the extruded layer.

9. The method according to claim 8 further comprising preheating the base strip of said channel cloth immediately prior to extruding said layer of plastic material.

* * * * *